(12) United States Patent
England

(10) Patent No.: US 12,518,634 B2
(45) Date of Patent: *Jan. 6, 2026

(54) SAFETY SYSTEM CONFIGURED TO DETERMINE WHEN A VEHICLE HAS MADE AN UNWANTED STOP

(71) Applicant: TJ England, Draper, UT (US)

(72) Inventor: TJ England, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,394

(22) Filed: Jan. 29, 2024

(65) Prior Publication Data

US 2024/0274014 A1 Aug. 15, 2024

Related U.S. Application Data

(63) Continuation of application No. 17/327,866, filed on May 24, 2021, now Pat. No. 11,887,484, which is a continuation of application No. 16/000,454, filed on Jun. 5, 2018, now Pat. No. 11,017,676.

(51) Int. Cl.
*G08G 1/00* (2006.01)
*B60W 40/105* (2012.01)
*G05D 1/00* (2006.01)
*G05D 1/692* (2024.01)
*G08G 1/01* (2006.01)

(52) U.S. Cl.
CPC ............ *G08G 1/22* (2013.01); *B60W 40/105* (2013.01); *G05D 1/0027* (2013.01); *G05D 1/692* (2024.01); *G08G 1/0133* (2013.01); *B60W 2420/403* (2013.01); *B60W 2420/408* (2024.01); *B60W 2554/00* (2020.02); *B60W 2556/45* (2020.02)

(58) Field of Classification Search
CPC ..... G08G 1/22; G08G 1/0133; B60W 40/105; B60W 2554/00; B60W 2556/45; B60W 2420/42; B60W 2420/52; G05D 1/0027; G05D 2201/0213
See application file for complete search history.

(56) References Cited

U.S. PATENT DOCUMENTS

| 4,843,370 | A | 6/1989 | Milde, Jr. | |
|---|---|---|---|---|
| 6,023,221 | A | 2/2000 | Michelotti | |
| 6,124,810 | A * | 9/2000 | Segal | G08G 1/20 340/905 |
| 6,393,361 | B1 * | 5/2002 | Yano | B60T 7/14 340/436 |
| 6,678,612 | B1 | 1/2004 | Khawam | |
| 11,017,676 | B2 * | 5/2021 | England | G08G 1/0141 |
| 11,021,075 | B2 * | 6/2021 | Wood | G06Q 10/047 |

(Continued)

FOREIGN PATENT DOCUMENTS

| CN | 204463457 | 7/2015 |
|---|---|---|
| JP | 2005045501 | 2/2005 |

(Continued)

*Primary Examiner* — Hussein Elchanti
(74) *Attorney, Agent, or Firm* — Ray Quinney & Nebeker P.C.; Paul N. Taylor

(57) ABSTRACT

A method for monitoring a vehicle includes determining that the vehicle is stopped and determining a location where the vehicle is stopped. Traffic congestion corresponding to the location where the vehicle is stopped may also be determined. A safety action may be taken based at least in part on whether the vehicle is stopped on a highway and whether the traffic congestion is causing the vehicle to be stopped.

20 Claims, 9 Drawing Sheets

(56) References Cited

U.S. PATENT DOCUMENTS

| | | | |
|---|---|---|---|
| 2003/0016146 A1 | 1/2003 | Bates et al. | |
| 2003/0201886 A1 | 10/2003 | Robbins et al. | |
| 2007/0124063 A1* | 5/2007 | Kindo | G08G 1/096791 |
| | | | 701/517 |
| 2010/0214087 A1* | 8/2010 | Nakagoshi | B60W 40/09 |
| | | | 340/436 |
| 2014/0341434 A1* | 11/2014 | Lin | G08G 1/167 |
| | | | 382/104 |
| 2015/0183441 A1* | 7/2015 | Aoki | B60W 40/09 |
| | | | 434/62 |
| 2015/0191176 A1* | 7/2015 | Kobana | B60W 50/12 |
| | | | 701/70 |
| 2015/0203126 A1* | 7/2015 | Kobana | B60W 50/12 |
| | | | 701/1 |
| 2015/0371456 A1 | 12/2015 | Moore, Jr. et al. | |

FOREIGN PATENT DOCUMENTS

| | | |
|---|---|---|
| JP | 2015/171851 | 10/2015 |
| KR | 100790796 | 1/2008 |
| KR | 100899118 | 5/2009 |
| WO | WO 2008156383 | 12/2008 |

\* cited by examiner

SAFETY SYSTEM CONFIGURED TO DETERMINE WHEN A VEHICLE HAS MADE AN UNWANTED STOP

CROSS-REFERENCE TO RELATED APPLICATIONS

This application is a continuation of U.S. patent application Ser. No. 17/327,866, filed May 24, 2021, which is a continuation of U.S. patent application Ser. No. 16/000,454, filed Jun. 5, 2018, now U.S. Pat. No. 11,017,676, which are hereby incorporated by reference in their entireties.

BACKGROUND

Motor vehicles travel at speeds much faster than humans can walk. Humans use motor vehicles for many different purposes, including commuting to and from work, traveling for vacations, and running errands.

Motor vehicles generally travel on roads. There are different types of roads. Motor vehicles may use local roads to travel around a neighborhood. Local roads may include traffic control devices such as stop lights or stop signs. Motor vehicles may also travel on freeways. Freeways may have speed limits higher than local roads. Freeways may also have on-ramps and off-ramps.

Safety is important when motor vehicles travel on a road. Accidents involving motor vehicles may cause significant harm and even death to drivers and passengers of motor vehicles.

Semi-trailer trucks may utilize roads to transport goods over long distances, often traveling for several days. Other vehicles, including delivery vans, passenger vehicles, and trucks, may also utilize roads to transport people, freight, or goods. These vehicles often move goods from manufacturers and suppliers to distribution and retail locations. These vehicles may be part of a fleet of vehicles. A carrier may manage a fleet from one or more locations. A carrier may be a company that transports goods for another company. The trucking industry in particular hauls a large percentage of freight in the United States. By some estimates, trucks move more than 10 billion tons of freight every year.

DETAILED DESCRIPTION

Vehicles use roads, including highways, to transport people, freight, or goods. Some vehicles that transport freight, including semi-trailer trucks, are often larger than other motor vehicles travelling on a highway. A collision between a motor vehicle and a semi-trailer truck may cause damage to the motor vehicle and may cause injury to a driver or passenger of the motor vehicle.

Vehicles transporting people, freight, or goods may be doing so for an individual or carrier. An accident involving a vehicle hauling freight for a carrier may create liability against the individual or carrier. An accident may also create liability for an owner or insurer of a vehicle. Thus, a carrier may want to monitor when a vehicle transporting people, freight, or goods on its behalf takes an action that increases the potential that the vehicle may be involved in an accident.

A vehicle that stops on a road may create a danger to other motor vehicles. For example, a vehicle that stops on a road when traffic is light and no traffic light or traffic sign requires a stop may create an accident because other drivers may not expect a stop in that situation. Another example may be when a vehicle stops on a side of a highway. Motor vehicles may travel at high speeds when travelling on a highway. Due to distracted driving, adverse weather or visibility conditions, lack of familiarity with a road, or for other reasons, a motor vehicle may veer outside its lane and collide with a vehicle stopped on a side of a highway.

It may be beneficial for an individual or carrier to know when a vehicle transporting people, freight, or goods on the individual or carrier's behalf has stopped on a road, including on a side of a highway. An individual or carrier may cause a fleet manager to contact a driver or occupant of a stopped vehicle. An individual or carrier may associate a stop with a driver for use in performance reviews and advancement and pay decisions. An individual or carrier may take other actions with respect to a vehicle that has made a potentially dangerous, unplanned, or unauthorized stop.

There may be instances where a vehicle has stopped on a highway, and an individual or carrier does not need or want to know about the stop. For example, heavy traffic may have caused a vehicle to stop. A vehicle may also be stopped on an on-ramp or off-ramp. It may be desirable to notify an individual or carrier about only certain stops in order to preserve resources of a carrier and to allow an individual or carrier to prioritize situations that may require a more immediate or urgent response.

Figure 1:
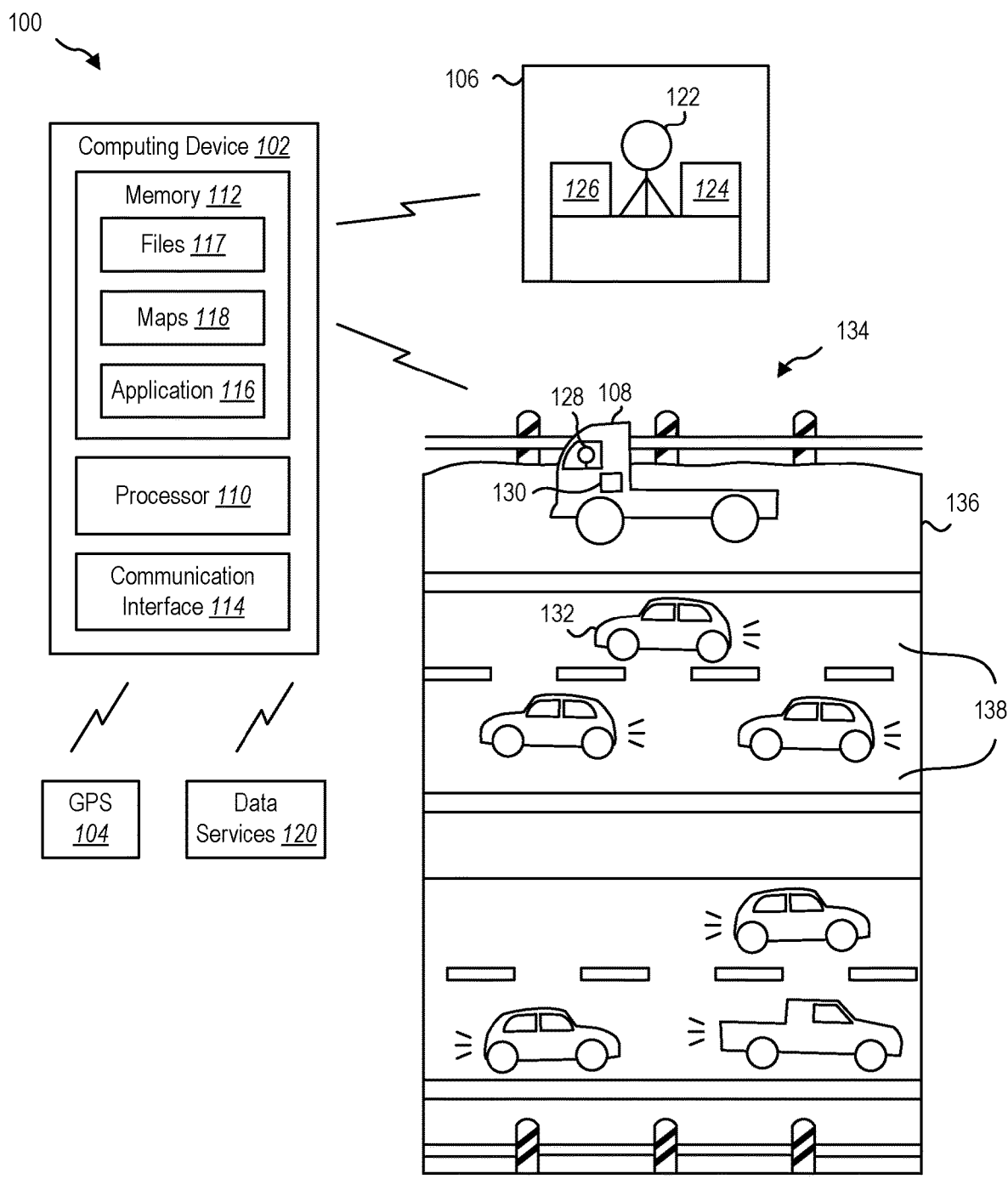
FIG. 1 illustrates one example of a system in which aspects of the present disclosure may be utilized.

FIG. 1 illustrates an example of a system 100 in which aspects of the present disclosure may be used. The system 100 may include a computing device 102, a central management location 106, and a vehicle 108. The computing device 102 may be located in the central management location 106, in the vehicle 108, or in another location. Although one computing device 102, one central management location 106, and one vehicle 108 are shown, the system 100 may include more than one of each of these elements. The system 100 may also contain additional elements not shown and may contain fewer than the elements shown.

The computing device 102 may be configured to receive information from a global positioning system (GPS) 104 and one or more data services 120. The computing device 102 may include a communication interface 114. The communication interface 114 may be configured to enable the computing device 102 to exchange information with the GPS 104, the data services 120, the vehicle 108, the central management location 106, and other persons, entities, systems, and devices.

The GPS 104 may provide geographic coordinates for the vehicle 108 and enable the computing device 102 to determine a geographic location of the vehicle 108. The GPS 104 may also enable the computing device 102 to determine speed and movement of the vehicle 108. The GPS 104 may provide information about locations of objects other than the vehicle 108.

The data services 120 may provide data and information useful to a person driving on a road or to a person responsible for a person driving on a road. For example, the data services 120 may provide information about, among other items, traffic, accidents, weather, road construction, location of traffic control devices, estimated travel times, road conditions, speed limit, location of roads and highways, location of on-ramps and off-ramps, location of rest stops, location of fuel stops, time of day, visibility, road closures, road grade, and road windiness. The data services 120 may provide data and information that correspond to the location of the vehicle 108.

The computing device 102 may be configured to receive information from the vehicle 108. The vehicle 108 may provide information about the vehicle, including make, model, year, location, speed, destination, fuel, freight, ignition status, parking brake status, gear status, mechanical or engine problems, flasher data, tire pressure, and maintenance record. The vehicle 108 may also provide information about a road on which the vehicle 108 is traveling. The vehicle 108 may also provide information to the central management location 106 and to other motor vehicles.

The computing device 102 may include one or more of a processor 110 and memory 112. The memory 112 may be any electronic component capable of storing electronic information. The processor 110 may process and execute instructions stored on the computing device 102 or the memory 112. The memory 112 may contain one or more applications 116, one or more maps 118, and one or more files 117.

The application 116 may contain instructions for determining whether the vehicle 108 has stopped. The application 116 may contain instructions that determine the vehicle 108 is stopped if the vehicle 108 is not moving. The application 116 may contain instructions that determine the vehicle 108 is stopped if the vehicle has not moved for at least a threshold period of time.

The application 116 may contain instructions for determining a type of location where the vehicle 108 has stopped. The vehicle 108 may stop in a variety of different types of locations, including a road, including a highway (such as a controlled-access highway designed for high-speed vehicular traffic), a parking lot, a residence, a loading dock, a fuel station, and a weigh station.

The maps 118 may contain information about geographic locations. The maps 118 may contain information about locations of roads, traffic control devices, on-ramps, and off-ramps. The data services 120 may provide information about geographic locations. The application 116 may include instructions for using information about the location of the vehicle 108 and information from the maps 118 and the data services 120 to determine a type of location where the vehicle 108 is located.

The application 116 may contain instructions for determining potential reasons the vehicle 108 has stopped. The application 116 may contain instructions for determining whether traffic congestion, a traffic control device, engine problems, a flat tire, a border inspection, a weigh station, construction, or weather may have caused the vehicle 108 to stop.

The application 116 may contain instructions for determining whether the vehicle 108 has made a stop of a type that warrants a safety action. A safety action may include any action intended to improve safety, either immediately or in the future. A safety action may include an alert to a driver, a manager, an insurance agent, emergency services, or data services. A safety action may include making a note in a driver file regarding a stop.

A stop warranting a safety action may be one or more of the following: a stop of a type that an individual or carrier or insurance agent wants to receive notice of; a stop of a type that an individual or carrier has not authorized; a stop that increases the potential for an accident involving a vehicle; a stop that is dangerous; a stop that indicates a vehicle needs assistance; a vehicle stopped on a road when circumstances do not require the vehicle to stop; or a vehicle stopped on a shoulder of a road. A stop warranting a safety action may be a stop that the computing device 102 determines has more than a threshold probability of being a stop of a certain type.

Determining whether the vehicle 108 has made a stop warranting a safety action may be based in part on one or more factors or criteria, including whether the vehicle 108 may be stopped on a road, whether the vehicle 108 may be stopped on a highway, whether traffic congestion may have caused the vehicle 108 to be stopped, whether a traffic control device may have caused the vehicle 108 to be stopped, whether issues with the vehicle 108 may have caused the vehicle 108 to be stopped, whether weather conditions may have caused the vehicle 108 to be stopped, or whether the vehicle 108 may be stopped on an on-ramp or off-ramp. For example, the application 116 may contain instructions that determine the vehicle 108 has made a stop warranting a safety action where the vehicle 108 has stopped on a highway and traffic congestion is not causing the vehicle 108 to be stopped. The application 116 may contain instructions that determine the vehicle 108 has not made a stop warranting a safety action where the vehicle 108 has stopped on a highway and traffic congestion is causing the vehicle 108 to be stopped. The application 116 may also contain instructions that determine a vehicle has made a stop warranting a safety action where the vehicle has stopped on a road and neither traffic congestion nor traffic control devices have caused the vehicle to stop.

The computing device 102 may contain files 117 for organizing information. The files 117 may be configured to contain information regarding multiple vehicles and multiple drivers and to organize the information by driver and/or vehicle. The files 117 may contain information regarding the vehicle 108 and a driver 128 of the vehicle 108. Information contained in the files 117 may include historical information about trips the vehicle 108 and the driver 128 have taken, past accidents involving the vehicle 108 and the driver 128, problems the vehicle 108 has had, employment history of the driver 128, and previous stops of the vehicle 108 and the driver 128 that warranted a safety action.

The central management location 106 may include a manager 122. The manager 122 may be associated with a carrier or an insurance provider. The manager 122 may have access to a communication device 124 and an input/output device 126. The manager 122 may have responsibility to oversee one or more vehicles. The communication device 124 may be configured to enable the manager 122 to communicate with the driver 128 of the vehicle 108. The communication device 124 may be configured to enable the manager 122 to communicate with other persons and entities. The input/output device 126 may be configured to enable the manager 122 to receive information and alerts from the internet, the computing device 102, the data services 120, the vehicle 108, and the GPS 104. The input/output device 126 may be configured to enable the manager 122 to send information to the internet, the computing device 102, the data services 120, the vehicle 108, or the GPS 104.

The vehicle 108 may be any motor vehicle or motorized vehicle. The vehicle 108 may have a GPS device 130. The GPS device 130 may enable the GPS 104 to determine a geographic location of the vehicle 108.

The vehicle 108 may travel on a highway 134. One or more motor vehicles 132 may travel on the highway 134. The highway 134 may include one or more lanes 138. The highway 134 may include a shoulder 136. The highway 134 may include on-ramps and off-ramps (not shown). The vehicle 108 may also travel on roads other than the highway 134.

The vehicle 108 may also have one or more cameras configured to capture images or video of an area in front of, adjacent to, or behind the vehicle 108. The one or more cameras or the vehicle 108 may transmit video or images from the one or more cameras to the computing device 102. The computing device 102 may use video or images from the one or more cameras to determine whether the vehicle 108 is stopped, to determine a location of the vehicle 108, to determine whether the vehicle 108 is on the shoulder 136 of the highway 134, or to determine traffic congestion corresponding to a location of the vehicle 108.

There may be one or more cameras associated with the highway 134. The one or more cameras associated with the highway 134 may capture images or video of the highway 134. The one or more cameras associated with the highway 134 may transmit images or video to the computing device 102 or to the data services 120. The computing device 102 may use video or images from the one or more cameras associated with the highway 134 to determine whether the vehicle 108 is stopped, to determine a location of the vehicle 108, to determine whether the vehicle 108 is on the shoulder 136 of the highway 134, or to determine traffic congestion corresponding to a location of the vehicle 108.

The application 116 may contain instructions for causing the computing device 102 to take one or more actions when the computing device 102 determines that the vehicle 108 has made a stop warranting a safety action. The application 116 may contain instructions that cause the computing device 102 to send an alert to one or more of the driver 128 and the manager 122. The application 116 may also cause the computing device 102 to note the stop in a file associated with the driver 128. The application 116 may also cause the computing device 102 to make a maintenance call or a call to emergency services.

The application 116 may contain instructions for determining what type of safety action to take. For example, the application 116 may contain instructions to take an urgent safety action if the computing device 102 determines that the vehicle 108 is stopped on a road, there is no traffic congestion, there is no traffic control device within a threshold distance of the vehicle 108, and there is no on-ramp or off-ramp within a threshold distance of the vehicle 108. The application 116 may contain instructions to take a less urgent safety action if the computing device 102 determines that the vehicle 108 is stopped on a road but there is an on-ramp or off-ramp within a threshold distance of the vehicle 108 or there is a traffic control device within a threshold distance of the vehicle 108.

Figure 2:
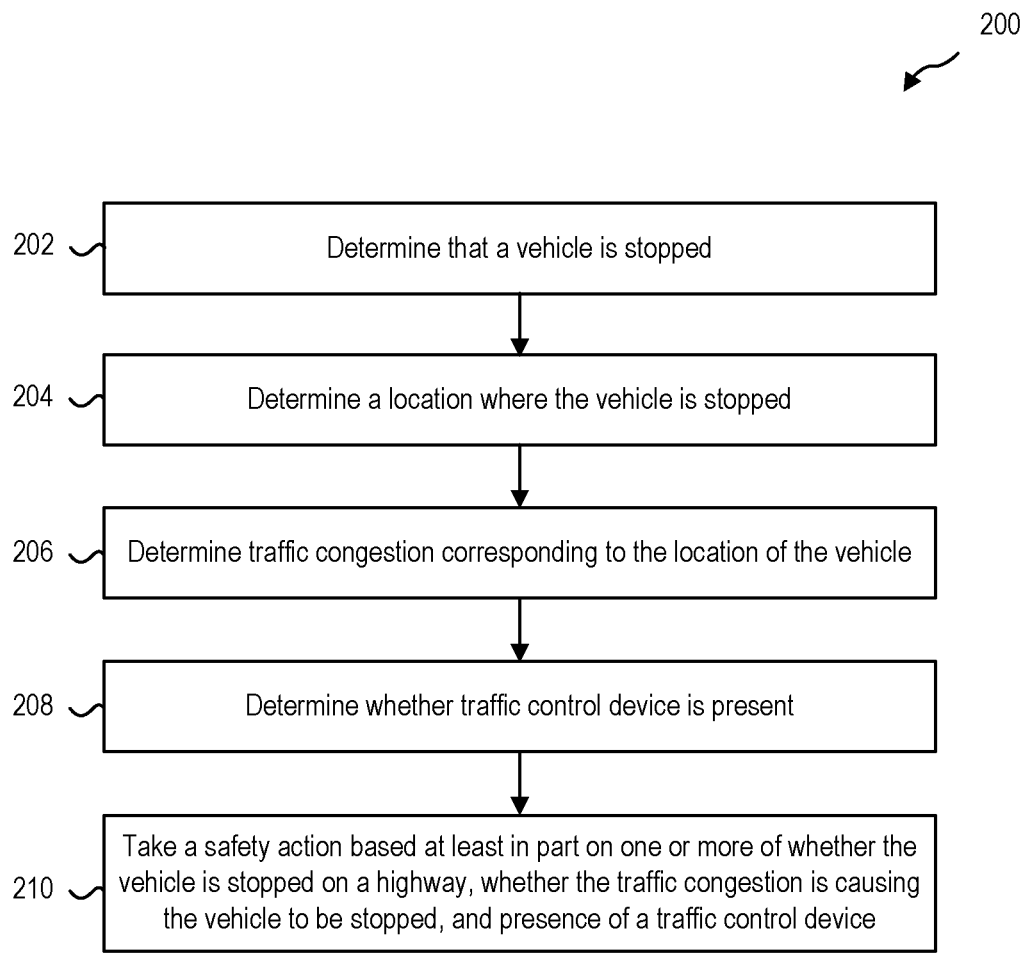
FIG. 2 is a flow diagram that illustrates an example of a method that may be implemented for monitoring a vehicle.

FIG. 2 illustrates one example of a method 200 that may be implemented for monitoring a vehicle. The method 200 may be practiced using one or more of the components in the system 100 shown in FIG. 1, including the computing device 102. It may also be practiced using other systems or devices capable of performing the method 200.

A system may first determine 202 that a vehicle is stopped. A system may use one or more methods to determine 202 that a vehicle is stopped. In determining whether a vehicle is stopped, a system may use information about a vehicle's location, a vehicle's speed, a vehicle's speed over time, whether a vehicle is in park, whether a vehicle's emergency brake is engaged, and whether a vehicle's ignition is on or off. A system may determine that a vehicle is stopped when the vehicle is not moving. A system may determine that a vehicle is stopped if the vehicle is in park, the vehicle's emergency brake is engaged, or the vehicle's ignition is turned off. A system may determine that a vehicle is stopped if the vehicle's location has not changed for a threshold period of time. A system may determine that a vehicle is stopped if the vehicle has not moved for a threshold period of time. A threshold period of time may be any measure of time such as one second or one minutes. A system may use various methods to determine that a vehicle is not moving, including GPS, electronic countermeasure, radar, and LIDAR. A system may also use information from one or more cameras to determine that a vehicle is not moving.

A system may then determine 204 a location where a vehicle is stopped. Determining 204 a location where a vehicle is stopped may include determining a geographic location of the vehicle. A system may use a GPS to determine 204 a location where a vehicle is stopped. A GPS may provide coordinates for a geographic location of a vehicle. Determining 204 a location where a vehicle is stopped may include comparing coordinates where a vehicle is stopped to information contained in a map or received from a data service about an area corresponding to coordinates where the vehicle is stopped. A system may also use video or images from one or more cameras to determine a location where a vehicle is stopped.

Determining 204 a location where a vehicle is stopped may include determining a type of location where the vehicle is stopped. A system may compare a geographic location of a vehicle with data from one or more maps, databases, or data services to determine a type of location that corresponds to the geographic location of the vehicle. For example, where a geographic location of a vehicle is identical to a geographic location of a road, a system may determine the vehicle is stopped on a road. A system may also determine a type of location where a vehicle is stopped by using video or images from one or more cameras. For example, a system may use video or images from one or more cameras to determine that a vehicle is stopped on a shoulder of a road, including a shoulder of a highway.

A system may also determine that a vehicle is stopped on a road, including a highway, even though a geographic location of a vehicle does not correspond exactly to a geographic location of a road. For example, a system may determine that a vehicle is on a road where a GPS indicates a location of the vehicle that is within a threshold distance (such as 5 feet, 10 feet, or 20 feet) of a road. It may be desirable for a system to determine that a vehicle is on a road even though a GPS indicates a location of the vehicle that is not on a road because the GPS may not return coordinates that perfectly represent the actual geographic location of the vehicle or because data regarding locations of roadways contained in maps or data services may not be perfectly accurate.

A system may determine 206 traffic congestion corresponding to a location of a vehicle. Traffic congestion may be one or both of a quantitative measure of traffic or a qualitative measure of traffic. A system may exchange information with data services to determine traffic congestion corresponding to a location of a vehicle. A system may provide information to a data service regarding a location of a vehicle and the data service may provide information to the system regarding one or more of traffic speed, traffic density, traffic volume, traffic flow, or level of service corresponding to that location. Traffic speed may be a measure of how fast motor vehicles are traveling in a particular area or across a particular point. Traffic density may be a measure of a number of vehicles that occupy an area. Traffic volume may be a measure of how many motor vehicles travel through an area or across a point over a period of time. Traffic flow may include a measure of how vehicles are interacting with each other on a road. Level of service may be a qualitative measure of traffic ranging from congestion-free to congested. Level of service may be based on one or more inputs, including speed, travel time, density, maneuverability, and delay. These measures may be based on average or instantaneous data. Similarly, a data service may provide to a system information about traffic congestion on all highways, and the system may use information about a location of a vehicle to determine traffic congestion for an area or point corresponding to the location of the vehicle. A system may determine 206 traffic congestion corresponding to a location of a vehicle based on real-time data and/or historical data. A system may use video or images captured by one or more cameras to determine 206 traffic congestion corresponding to a location of a vehicle. A system may use information from a radar or a LIDAR to determine 206 traffic congestion corresponding to a location of a vehicle.

Determining 206 traffic congestion corresponding to a location of a vehicle may include determining traffic congestion for an area in front of a vehicle, around a vehicle, or within a threshold distance of a vehicle. Determining 206 traffic congestion corresponding to a location of a vehicle may include determining traffic congestion at a point in front of a vehicle, adjacent to a vehicle, or within a threshold distance of a vehicle. Determining 206 traffic congestion corresponding to a location of a vehicle may be based on one or more of traffic speed, traffic density, traffic volume, traffic flow, or level of service. Determining 206 traffic congestion corresponding to a location of a vehicle may be based on other information, calculations, or factors such as time of day, whether traffic is increasing or decreasing, number of lanes on a road, or day of the week.

A system may determine 208 whether a traffic control device is present. A traffic control device may be any marker, sign, or signal device used to control or guide traffic. Traffic control devices may include traffic signs, electronic message boards, cones, road markings, traffic lights, or speed bumps. A system may use a location of a vehicle and information received from a data service to determine whether a traffic control device is present. A system may determine that a traffic control device is present if a traffic control device is within a threshold distance of a vehicle.

A system may take 210 a safety action based at least in part on one or more of whether a vehicle is stopped on a road, a type of road on which a vehicle is stopped, whether traffic congestion is causing a vehicle to be stopped, and presence of a traffic control device.

A safety action may include one or more of sending an alert to a vehicle, causing the hazard lights of a vehicle to turn on, sending an alert to a manager of a vehicle, sending an alert to a representative of a carrier of a driver of a vehicle, sending an alert to an insurance agent, adding a note to a file of a driver of a vehicle, sending an alert to a data service, or sending an alert to motor vehicles near a vehicle. A safety action may include other actions meant to improve safety of a driver, a vehicle, a road, a location, or other motor vehicles.

A system may use one or more methods, criteria, or standards to determine whether to take a safety action and what type of safety action to take. A system may take a safety action if a vehicle makes a stop that a carrier has not authorized or that increases the probability a vehicle will be involved in an accident. A system may take a safety action if a vehicle has made a dangerous stop. A system may take a safety action if a vehicle has made an illegal stop. A system may take a safety action if a vehicle has stopped in a place where other motor vehicles do not expect a stopped vehicle. A system may take a safety action if the probability that a vehicle has made a certain type of stop is greater than a threshold probability.

By way of example, a system may take 210 a safety action where a vehicle is stopped on a road and neither traffic congestion nor a traffic control device is causing the vehicle to be stopped. A system may take 201 a safety action in that situation because in those circumstances the vehicle may be stopped on the side of a road or be stopped in the middle of a road in a situation that other drivers do not expect (which may be types of stops that increase the likelihood that the vehicle will be involved in an accident). A system may not take a safety action where a vehicle is stopped on a road and traffic congestion has caused the vehicle to be stopped because in those circumstances the vehicle may be stopped in a traffic jam. A system may not take a safety action where a vehicle is stopped but not on a road because the vehicle may be stopped at a place where vehicles are expected to be stopped (such as at a fuel station). A system may not take a safety action where a vehicle is stopped and a traffic control device is present because the vehicle may be stopped at a traffic light.

A system may use one or more methods to determine whether traffic congestion has caused a vehicle to stop. A system may determine that traffic congestion has caused a vehicle to stop if one or more quantitative measurements of traffic congestion meet certain threshold standards. A system may determine that traffic congestion has caused a vehicle to stop based on determining one or more of the following for an area or point corresponding to a location of the vehicle: that traffic speed is less than a threshold speed; that traffic density is greater than a threshold density; that traffic volume is greater than a threshold volume; that traffic flow is less than a threshold flow; or that level of service is less than a threshold level. A system may determine that traffic congestion has caused a vehicle to stop based on information received from data services. For example, a data service may rate traffic congestion on a scale from 0 (no traffic) to 10 (traffic jam). A system may be configured to determine that traffic congestion has caused a vehicle to be stopped where a data service reports traffic congestion corresponding to a location of a vehicle of between 7 and 10.

A system may determine what safety action to take based on how likely it is that a vehicle has made an unauthorized stop. A system may determine what safety action to take based on how urgent a response is needed. A system may determine what safety action to take based on whether a vehicle is within a threshold distance of a traffic control device, whether a vehicle is within a threshold distance of an on-ramp or off-ramp, whether a vehicle is out of fuel, whether a vehicle is having mechanical problems, whether a vehicle has a flat tire, whether it is dark where a vehicle is located, whether driver visibility may be impaired where a vehicle is located, whether adverse weather conditions are present where a driver is located, and whether a driver of a vehicle has previously made a dangerous or unauthorized stop.

Figure 3A:
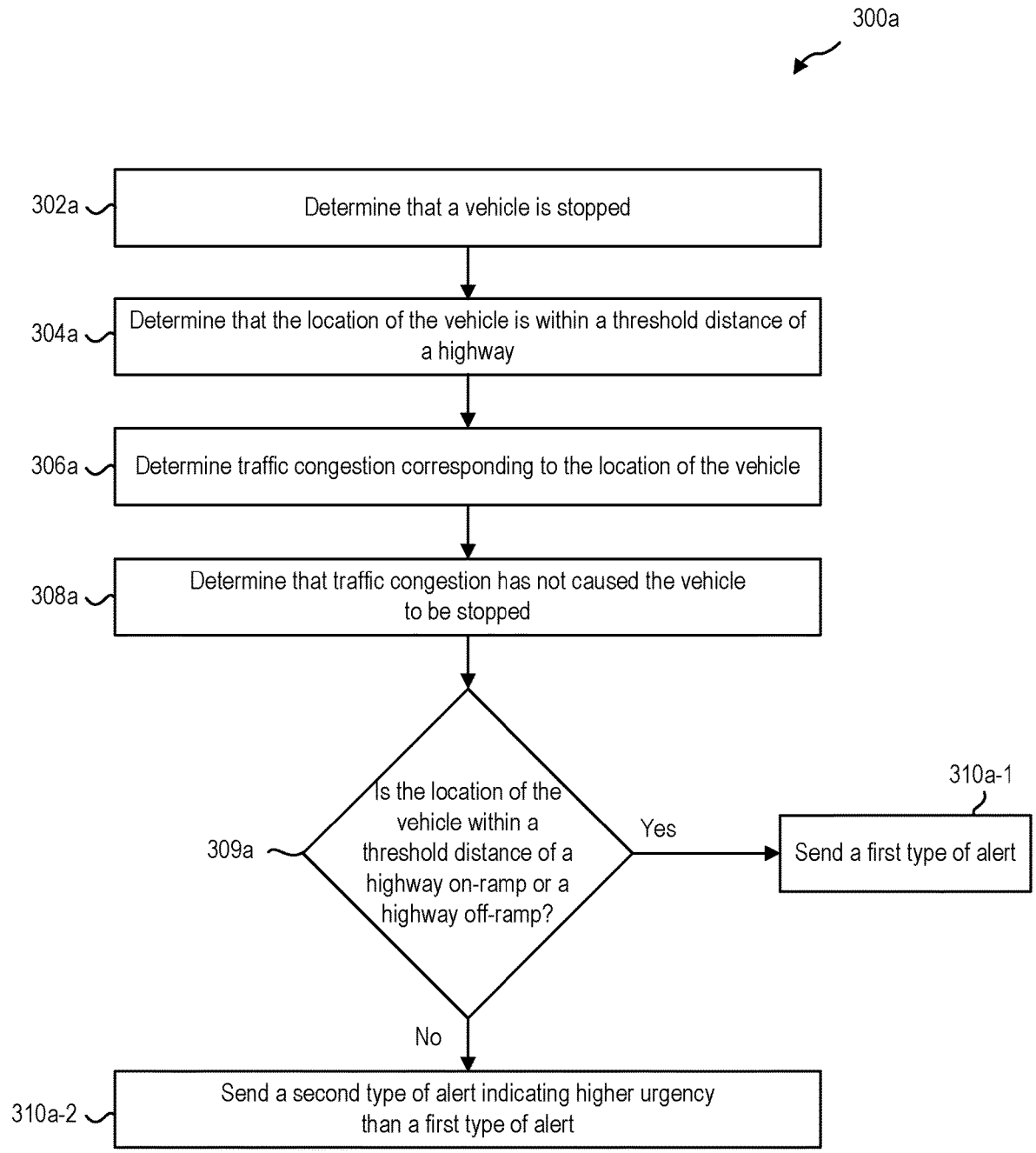
FIG. 3A is a flow diagram that illustrates an example of a method that may be implemented for determining a type of alert to send with respect to a vehicle.

FIG. 3A illustrates one example of a method 300a that may be implemented for determining a type of alert to send regarding a vehicle. In accordance with the method 300a, a system may first determine 302a that a vehicle is stopped. A system may use methods and criteria like those described in reference to FIG. 2 in determining 302a whether a vehicle is stopped.

A system may determine 304a that a location of a vehicle is within a threshold distance of a highway. A system may compare a geographic location of a vehicle with data from one or more maps, databases, or data services to determine whether a vehicle is within a threshold distance of a highway.

A system may determine 306a traffic congestion corresponding to a location of a vehicle. A system may use methods and criteria like those described in reference to FIG. 2 in determining 306a traffic congestion corresponding to a location of a vehicle.

A system may determine 308a that traffic congestion has not caused a vehicle to be stopped. A system may use one or more methods to determine 308a that traffic congestion has not caused a vehicle to be stopped. A system may determine that traffic congestion has not caused a vehicle to stop based on determining one or more of the following corresponding to a location of the vehicle: that traffic speed is greater than a threshold speed; that traffic density is less than a threshold density; that traffic volume is less than a threshold volume; that traffic flow is greater than a threshold flow; or that level of service is greater than a threshold level. A system may determine that traffic congestion has not caused a vehicle to stop based on information received from data services.

A system may then determine 309a whether a location of a vehicle is within a threshold distance of a highway on-ramp or a highway off-ramp. A system may use information from maps and data services to determine locations of on-ramps and off-ramps.

If a location of a vehicle is within a threshold distance of a highway on-ramp or a highway off-ramp, a system may send 310a-1 a first type of alert. If the location of a vehicle is not within a threshold distance of a highway on-ramp or a highway off-ramp, a system may send 310a-2 a second type of alert indicating higher urgency than the first type of alert.

The first type of alert may be different from the second type of alert. The second type of alert may indicate higher urgency than the first type of alert. For example, the second type of alert may be sent to a manager and instruct the manager to immediately contact a driver of a vehicle while the first type of alert may be sent to a manager and instruct the manager to check a vehicle's location on a map within a specified period of time (such as two minutes). The second type of alert may be sent to more or different places than the first type of alert. For example, the second type of alert may be sent to a manager and a supervisor of the manager while the first type of alert may be sent only to the manager.

Figure 3B:
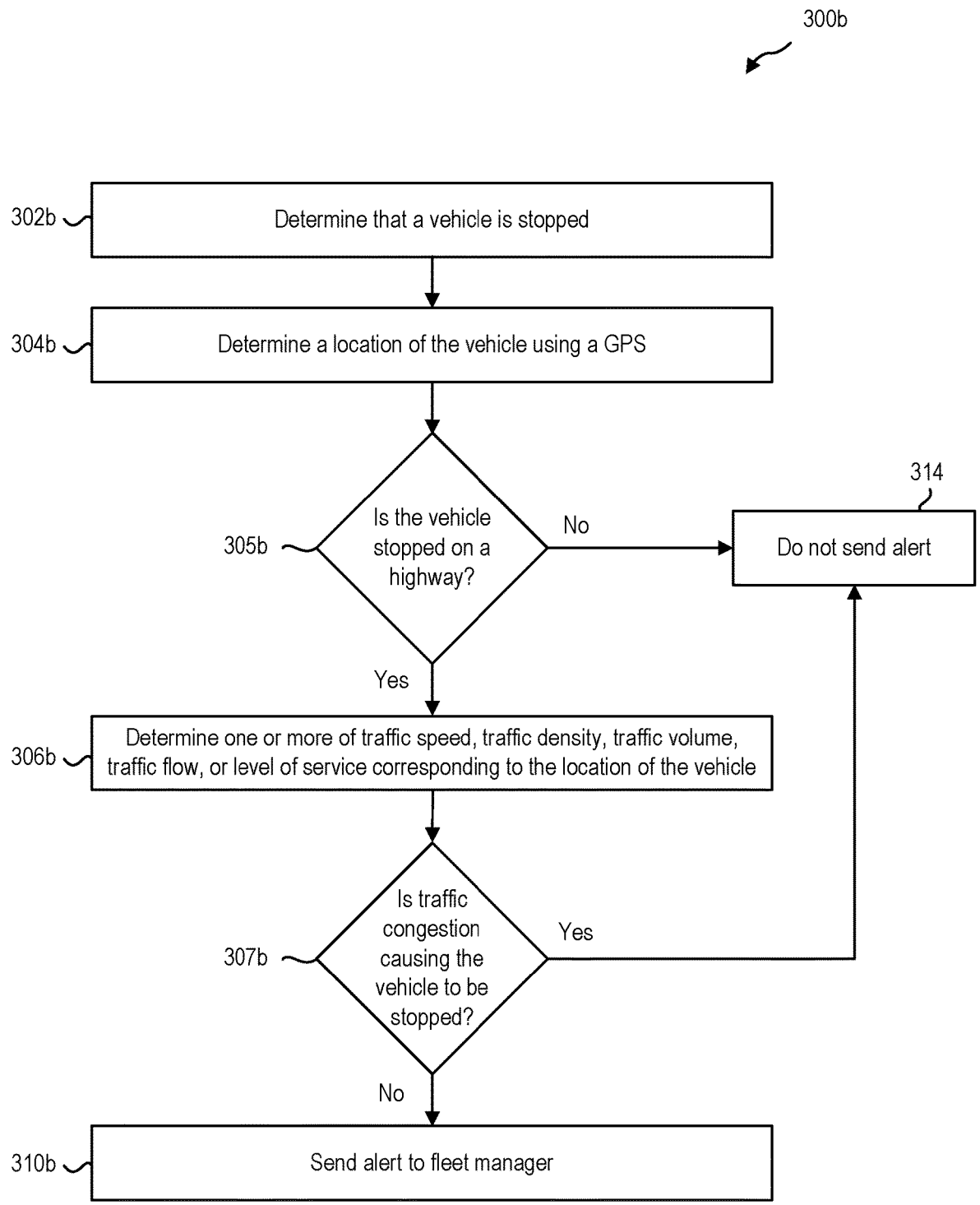
FIG. 3B is a flow diagram that illustrates an example of a method that may be implemented for determining whether to send an alert with respect to a vehicle.

FIG. 3B illustrates one example of a method 300b that may be implemented for determining whether to send an alert to a fleet manager. A fleet manager may be a person with responsibility to oversee two or more vehicles that form a fleet.

A system may first determine 302b that a vehicle is stopped. A system may use methods and criteria like those described in reference to FIG. 2 in determining 302b whether a vehicle is stopped.

A system may determine 304b a location of a vehicle using a GPS. A GPS may provide coordinates for a geographic location of a vehicle. Determining 304b a location where a vehicle is stopped may include comparing coordinates where a vehicle is stopped to information contained in a map or received from a data service about an area corresponding to the coordinates where the vehicle is stopped.

A system may determine 305b whether a vehicle is stopped on a highway. Determining 305b whether a vehicle is stopped may include comparing a geographic location of a vehicle with data from one or more maps, databases, or data services. For example, where a geographic location of a vehicle is identical to a geographic location of a highway, a system may determine a highway as a type of location where the vehicle is stopped. A system may also determine that a vehicle is stopped on a highway even though a geographic location of a vehicle is not identical to a geographic location of a highway. For example, a system may determine that a vehicle is on a highway where a GPS indicates a location of the vehicle that is within a threshold distance (such as 5 feet, 10 feet, or 20 feet) of a highway.

If a vehicle has not stopped on a highway, a system may not send 314 an alert. For example, a system may not send 314 an alert if a vehicle has stopped at a residential address, at a fuel station, or at a distribution center. If a vehicle has stopped on a highway, a system may determine 306b one or more of traffic speed, traffic density, traffic volume, traffic flow, or level of service corresponding to the location of the vehicle.

A system may then determine 307b whether traffic congestion is causing the vehicle to be stopped. A system may use one or more methods to determine 307b whether traffic congestion has caused a vehicle to be stopped. A system may determine 307b that traffic congestion has caused a vehicle to be stopped based on determining one or more of the following corresponding to a location of the vehicle: that traffic speed is less than a threshold speed; that traffic density is greater than a threshold density; that traffic volume is greater than a threshold volume; that traffic flow is less than a threshold flow; or that level of service is less than a threshold level.

If traffic congestion is causing a vehicle to be stopped, a system may not send 314 an alert. If traffic congestion is not causing a vehicle to be stopped, a system may send 310b an alert to a fleet manager. A fleet manager may be a person responsible for overseeing a vehicle. An alert to a fleet manager may instruct the fleet manager to take certain actions with respect to a vehicle. For example, an alert may instruct a fleet manager to immediately call a driver of a vehicle.

Figure 3C:
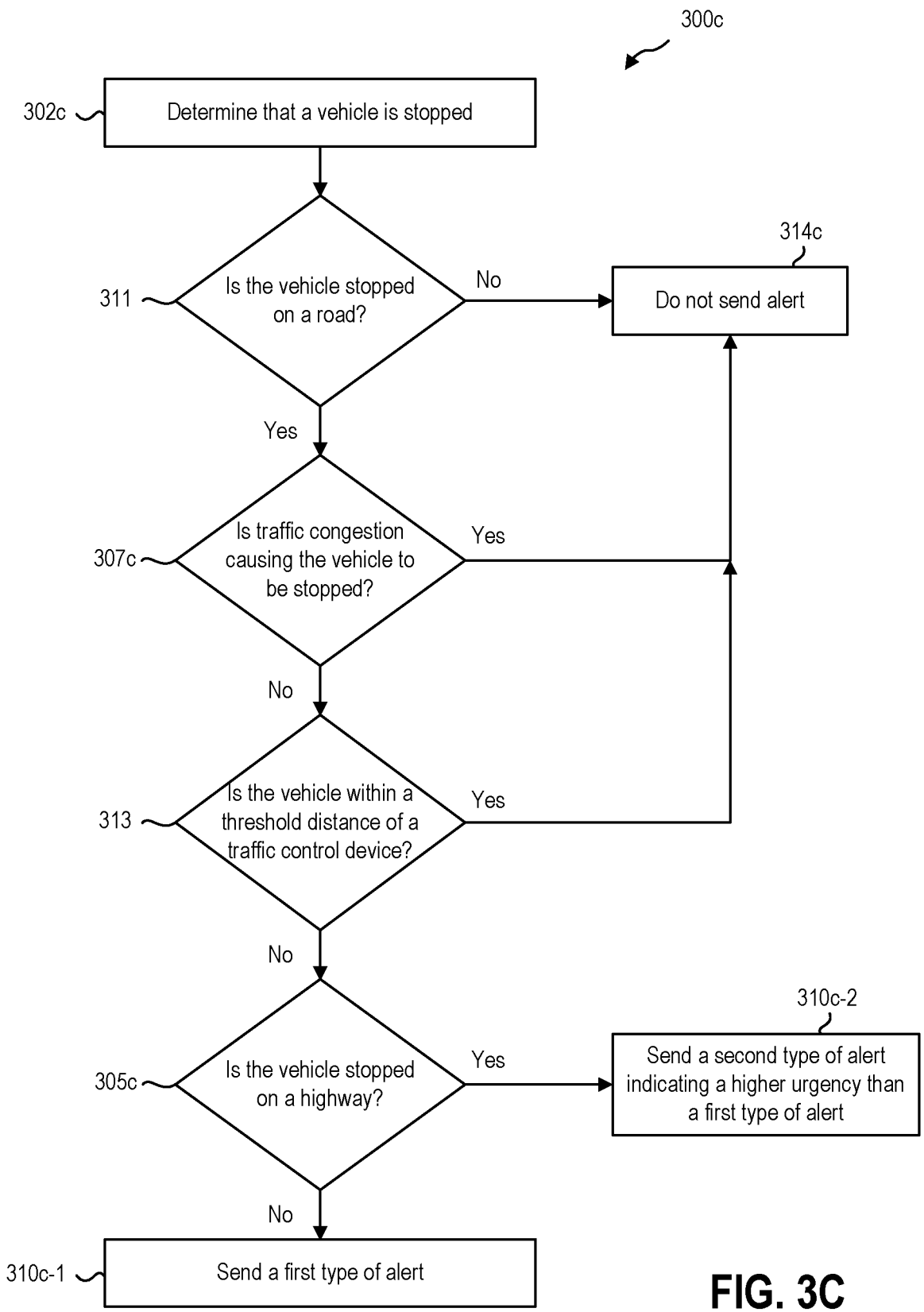
FIG. 3C is a flow diagram that illustrates an example of a method that may be implemented for determining a type of alert to send regarding a vehicle.

FIG. 3C illustrates one example of a method 300c that may be implemented for determining a type of alert to send regarding a vehicle. In accordance with the method 300c, a system may first determine 302c that a vehicle is stopped. A system may use methods and criteria like those described in reference to FIG. 2 in determining 302c whether a vehicle is stopped.

A system may determine 311 whether a vehicle is stopped on a road. A system may compare a geographic location of a vehicle with data from one or more maps, databases, or data services to determine whether a vehicle is stopped on a road. If a vehicle is not stopped on a road, a system may determine 314c to not send an alert regarding the vehicle.

If a system determines that a vehicle is stopped on a road, the system may determine 307c whether traffic congestion corresponding to a location of the vehicle is causing the vehicle to be stopped. A system may use methods and criteria like those described in reference to FIG. 2 in determining 307c whether traffic congestion corresponding to a location of a vehicle is causing the vehicle to be stopped. If traffic congestion corresponding to a location of a vehicle is causing the vehicle to be stopped, a system may determine 314c to not send an alert regarding the vehicle.

If a system determines that traffic congestion has not caused a vehicle to be stopped, a system may determine 313 whether a location of a vehicle is within a threshold distance of a traffic control device. A system may use information from maps and data services to determine locations of traffic control devices. If a vehicle is within a threshold distance of a traffic control device, a system may determine 314c to not send an alert regarding the vehicle.

If a location of a vehicle is within a threshold distance of a traffic control device, a system may determine 305c whether the vehicle is stopped on a highway. If a vehicle is not stopped on a highway, a system may send 310c-1 a first type of alert. If a vehicle is stopped on a highway, a system may send 310c-2 a second type of alert indicating higher urgency than the first type of alert.

The first type of alert may be different from the second type of alert. The second type of alert may indicate higher urgency than the first type of alert. For example, the second type of alert may be sent to a manager and instruct the manager to immediately contact a driver of a vehicle while the first type of alert may be sent to a manager and instruct the manager to check a vehicle's location on a map within a specified period of time (such as two minutes). The second type of alert may be sent to more or different places than the first type of alert. For example, the second type of alert may be sent to a manager and a supervisor of the manager while the first type of alert may be sent only to the manager.

Figure 4:
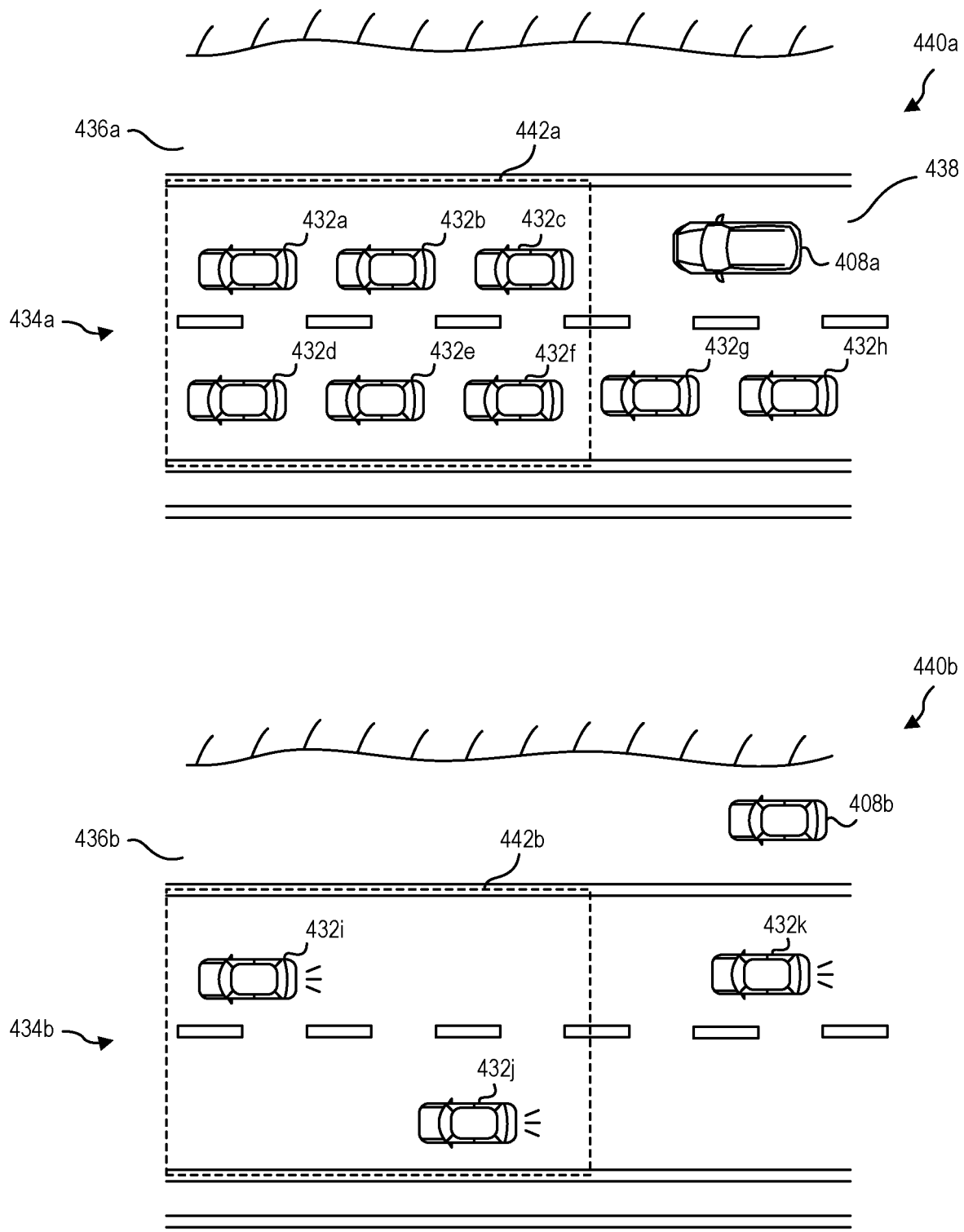
FIG. 4 illustrates examples of situations to which aspects of the present disclosure may be applied.

FIG. 4 illustrates examples of situations in which the methods disclosed herein may be implemented. A first situation 440a shows a vehicle 408a on a highway 434a. The vehicle 408a is traveling in a lane 438 of the highway 434a. One or more motor vehicles 432 are on the highway 434a. The highway 434a has a shoulder 436a. The vehicle 408a may be considered for purposes of this illustration to not be moving.

A system may determine that the vehicle 408a is stopped because the vehicle 408a is not moving. A system may then determine a location of the vehicle 408a. A GPS may determine a geographic location of the vehicle 408a. A GPS may determine a geographic location of the vehicle 408a that is on the highway 434a.

A system may then determine traffic congestion corresponding to a location of the vehicle 408a. An area 442a represents one possible area corresponding to a location of the vehicle 408a. One potential measure of traffic congestion may be traffic density. One potential way to calculate traffic density may be to count a number of motor vehicles in an area. There are six motor vehicles 432a, 432b, 432c, 432d, 432e, 432f in the area 442a. For purposes of this illustration, a system may determine that the area 442a has a traffic density of six motor vehicles per area. Another potential measure of traffic congestion may be traffic flow. One way to calculate traffic flow may be to determine an average speed of motor vehicles in an area. Assume for purposes of this illustration that the average speed of the motor vehicles 432a, 432b, 432c, 432d, 432e, 432f in the area 442a is one mile per hour. For purposes of this illustration, a system may determine traffic congestion for the area 442a that includes a traffic density of six motor vehicles per area and a traffic flow of one mile per hour.

The first situation 440a does not show a traffic control device. Thus, in the first situation 440a, a system may determine that a traffic control device is not present.

Assume for purposes of this illustration that a system is configured to take a safety action when the vehicle 408a is stopped on a highway and traffic congestion has not caused the vehicle 408a to be stopped. Also assume for purposes of this illustration that a system is configured to determine that a vehicle is stopped on a highway if a vehicle is not moving and its geographic location corresponds to a location of a highway. In addition, assume for purposes of this illustration that a system is configured to determine that traffic congestion has caused a vehicle to be stopped if, for an area or point corresponding to a location of the vehicle, traffic density is greater than five motor vehicles per area and traffic flow is less than two miles per hour.

With these assumptions, a system may determine that a safety action is not needed in the first situation 440a. Even though a system may determine that the vehicle 408a is stopped on the highway 434a, a system may determine that traffic congestion caused the vehicle 408a to be stopped because the area 442a has a traffic density greater than five motor vehicles per area and a traffic flow less than two miles per hour.

FIG. 4 also shows a second situation 440b. The second situation 440b shows a vehicle 408b on a highway 434b. In the second situation, the vehicle 408b is on a shoulder 436b of the highway 434b. Motor vehicles 432i, 432j, 432k are on the highway 434b. The vehicle 408b may be considered for purposes of this illustration to not be moving.

A system may determine that the vehicle 408b is stopped because the vehicle 408b is not moving. A system may then determine a location of the vehicle 408b. A GPS may determine a geographic location of the vehicle 408b that is on the highway 434b.

A system may then determine traffic congestion corresponding to a location of the vehicle 408b. An area 442b represents one possible area corresponding to a location of the vehicle 408b. There are two motor vehicles 432i, 432j in the area 442b. For purposes of this illustration, a system may determine that the area 442b has a traffic density of two motor vehicles per area. Assume for purposes of this illustration that the average speed of the motor vehicles 432i, 432j in the area 442b is 65 miles per hour. For purposes of this illustration, a system may determine traffic congestion for the area 442b that includes a traffic density of two and a traffic flow of 65 miles per hour.

The second situation 440b does not show a traffic control device. Thus, a system may determine that a traffic control device is not present.

Assume for purposes of this illustration that a system is configured to take a safety action when the vehicle 408b is stopped on a highway and traffic congestion has not caused the vehicle 408b to be stopped. Assume for purposes of this illustration that a system is configured to determine that a vehicle is stopped on a highway if a vehicle is not moving and its geographic location corresponds to a location of a highway. Assume for purposes of this illustration that a system is configured to determine that traffic congestion has caused a vehicle to be stopped if, for an area or point corresponding to a location of the vehicle, traffic density is greater than five motor vehicles per area and traffic flow is less than two miles per hour.

With these assumptions, a system may take a safety action in the second situation 440b. A system may determine that the vehicle 408b is stopped on the highway 434b because the vehicle 408b is not moving and the vehicle 408b has a geographic location corresponding to a location of the highway 434b. A system may determine that traffic congestion did not cause the vehicle 408b to be stopped because the area 442b has a traffic density less than five motor vehicles per area and a traffic flow greater than two miles per hour.

A system may take a safety action that includes sending an alert to a fleet manager. A system may also take a safety action that includes sending an alert to a driver of the vehicle 408b.

Figure 5:
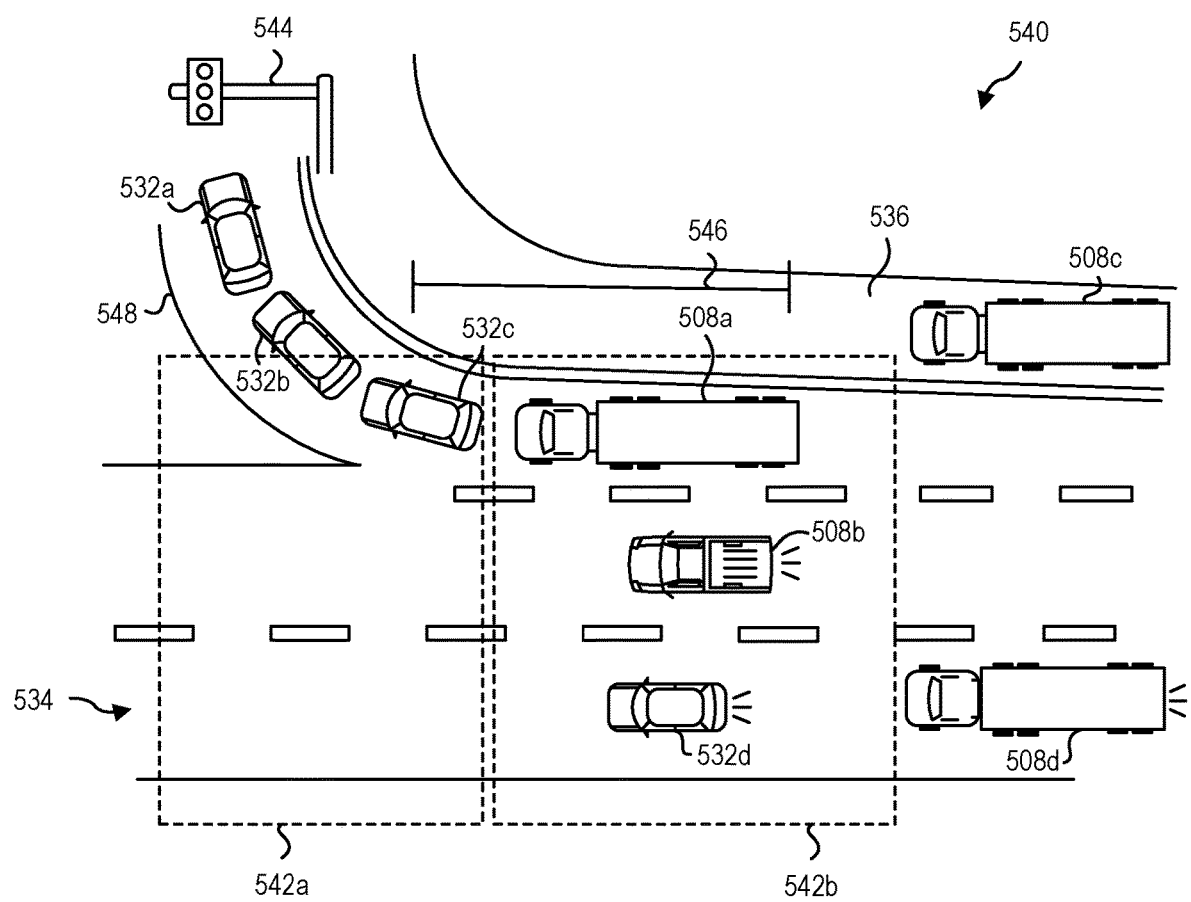
FIG. 5 illustrates another example of a situation to which aspects of the present disclosure may be applied.

FIG. 5 illustrates a situation 540 in which the methods disclosed herein may be implemented. In the situation 540, a highway 534 is shown. The highway 534 has an off-ramp 548. The off-ramp 548 has a traffic control device 544. In this illustration, the traffic control device 544 is a traffic signal. Three motor vehicles 532a, 532b, 532c are at least partially on the off-ramp 548. The motor vehicles 532a, 532b, 532c are not moving. A first vehicle 508a, a second vehicle 508b, a third vehicle 508c and a fourth vehicle 508d are shown on the highway 534. The third vehicle 508c is on a shoulder 536 of the highway 534. Assume for purposes of this illustration that the first vehicle 508a is not moving and has not been moving for 25 seconds, the second vehicle 508b is moving at 60 miles per hour, the third vehicle 508c has not been moving for 30 seconds, and the fourth vehicle 508d is moving at 70 miles per hour. A motor vehicle 532d is traveling at 80 miles per hour on the highway 534.

Assume for purposes of this illustration that a GPS returns locations for the first vehicle 508a, the second vehicle 508b, and the fourth vehicle 508d that correspond to the highway 534. Assume that a GPS returns a location for the third vehicle 508c that is 15 feet away from the highway 534.

Assume for purposes of this illustration that a system is configured to determine that a vehicle is stopped when it has not moved for at least 10 seconds. Assume for purposes of this illustration that a system is configured to use a threshold distance of 20 feet in determining whether a vehicle is within a threshold distance of a highway. Assume for purposes of this illustration that a system is configured to use a threshold distance of 30 feet in determining whether a vehicle is within a threshold distance of an off-ramp. A distance 546 is shown in FIG. 5. For purposes of this illustration, the distance 546 represents a length of 30 feet from the off-ramp 548.

Assume for purposes of this illustration that a system is configured to determine that traffic congestion has caused a vehicle to be stopped if, for an area or point corresponding to a location of the vehicle, traffic density is greater than five motor vehicles per area and traffic flow is less than two miles per hour.

With respect to the first vehicle 508a, a system may determine that the first vehicle 508a is stopped because the first vehicle 508a has not moved for 25 seconds (which is longer than 10 seconds). A system may determine that the first vehicle 508a is within a threshold distance of a highway because the first vehicle 508a has a GPS location corresponding to the highway 534.

For purposes of this illustration, a first area 542a may represent an area corresponding to a location of the first vehicle 508a. A system may determine traffic congestion corresponding to the first area 542a. One potential component of traffic congestion may be traffic density. One potential way to calculate traffic density may be to count a number of motor vehicles in an area. There are 1.5 motor vehicles in the first area 542a (half of motor vehicle 532b and all of motor vehicle 532c). For purposes of this illustration, a system may determine that the first area 542a has a traffic density of 1.5 motor vehicles per area. Another potential measure of traffic congestion may be to determine traffic flow. One way to calculate traffic flow may be to determine an average speed of motor vehicles in an area. Assume for purposes of this illustration that the average speed of the motor vehicles 532c, 532b in the first area 542a is zero miles per hour. For purposes of this illustration, a system may determine traffic congestion for the first area 542a that includes a traffic density of 1.5 and a traffic flow of zero.

A system may determine that traffic congestion has not caused the first vehicle 508a to stop because traffic density for the first area 542a is not greater than five motor vehicles per area. As a result, a system may determine to take a safety action that may include sending an alert.

A system may determine that the first vehicle 508a is within a threshold distance of the off-ramp 548 because the first vehicle 508a is within the distance 546 of the off-ramp 548. Because the first vehicle 508a is within a threshold distance of the off-ramp 548, a system may send a first type of alert. A first type of alert may be sent to a fleet manager. A first type of alert may indicate to a fleet manager that the first vehicle 508a has stopped but that urgent action is not necessary because the first vehicle 508a may be stopped on an off-ramp.

For purposes of this illustration, a system may determine that the traffic control device 544 is present. A system may be configured to not send an alert when a traffic control device is present. A system so configured may not send a first type of alert with respect to the first vehicle 508a.

With respect to the second vehicle 508b, a system may determine that the second vehicle 508b is not stopped because the second vehicle 508b is traveling at 60 miles per hour (which is a speed greater than two miles per hour). As a result, a system may not send any type of alert with respect to the second vehicle 508b.

With respect to the third vehicle 508c, a system may determine that the third vehicle 508c is stopped because the third vehicle 508c has not been moving for at least 10 seconds. A system may determine that the third vehicle 508c is within a threshold distance of a highway because the third vehicle 508c has a GPS location within 20 feet of the highway 534.

For purposes of this illustration, a second area 542b may represent one possible area corresponding to a location of the third vehicle 508c. A system may determine traffic congestion corresponding to the second area 542b. One potential component of traffic congestion may be traffic density. One potential way to calculate traffic density is to count a number of motor vehicles in an area. There are three motor vehicles in the second area 542b (the first vehicle 508a, the second vehicle 508b, and motor vehicle 532d). For purposes of this illustration, a system may determine that the second area 542b has a traffic density of three motor vehicles per area. Another potential measure of traffic congestion may be to determine traffic flow. One way to calculate traffic flow may be to determine an average speed of motor vehicles in an area. Assume for purposes of this illustration that the average speed of the first vehicle 508a, the second vehicle 508b, and the motor vehicle 532d in the second area 542b is approximately 47 miles per hour. For purposes of this illustration, a system may determine traffic congestion for the second area 542b that includes a traffic density of three and a traffic flow of 47.

A system may determine that traffic congestion has not caused the third vehicle 508c to stop because traffic density for the second area 542b is not greater than five motor vehicles per area and because traffic flow for the second area 542b is not less than two miles per hour.

A system may determine that the third vehicle 508c is not within a threshold distance of the off-ramp 548 because the third vehicle 508c is not within the distance 546 of the off-ramp 548. Because the third vehicle 508c is not within a threshold distance of the off-ramp 548, a system may send a second type of alert. A second type of alert may be sent to a fleet manager. A second type of alert may indicate to a fleet manager that the third vehicle 508c has made a dangerous or unauthorized stop and that urgent action is required because the third vehicle 508c may be stopped on a side of a highway.

With respect to the fourth vehicle 508d, a system may determine that the fourth vehicle 508d is not stopped because the fourth vehicle 508d is moving. Accordingly, a system may not take a safety action with respect to the fourth vehicle 508d.

Figure 6:
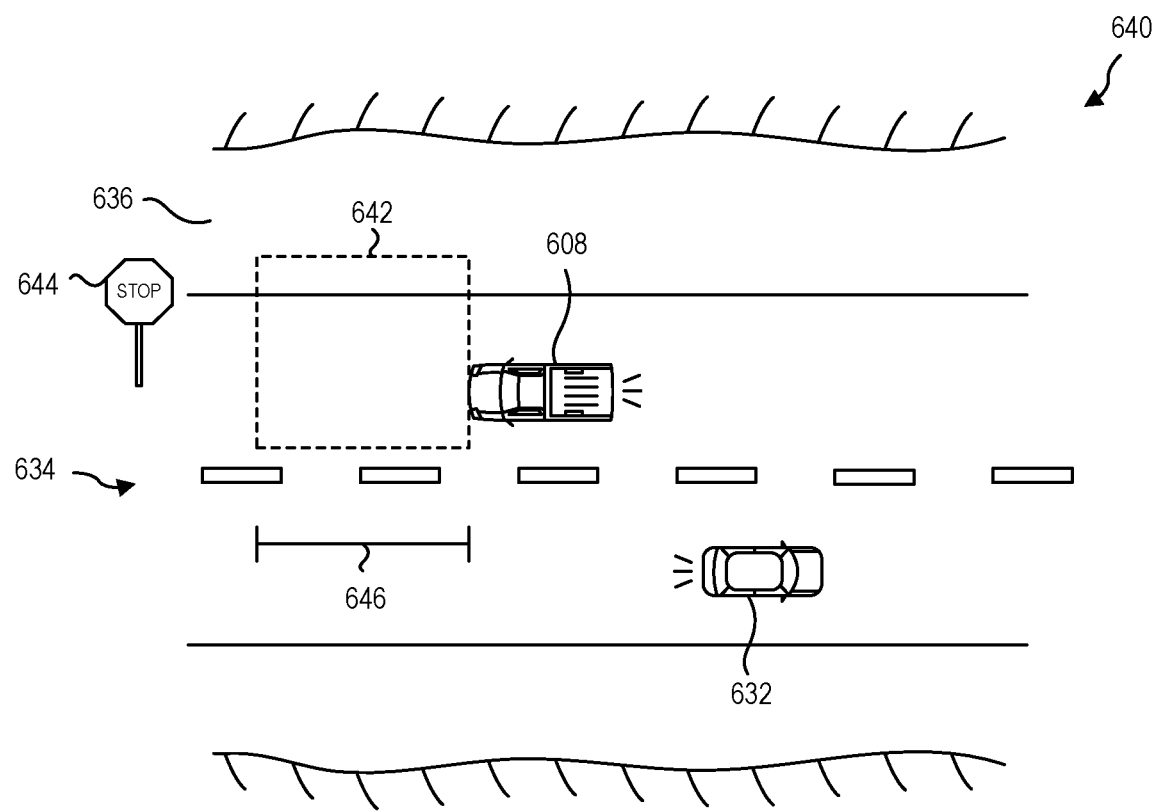
FIG. 6 illustrates another example of a situation in which aspects of the present disclosure may be applied.

FIG. 6 illustrates a situation in which the methods disclosed herein may be implemented. A situation 640 shows a vehicle 608 on a road 634. A motor vehicle 632 is shown on the road 634. The road 634 has a shoulder 636. The vehicle 608 may be considered for purposes of this illustration to not be moving.

A system may determine that the vehicle 608 is stopped because the vehicle 608 is not moving. A system may then determine a location of the vehicle 608. A GPS may determine a geographic location of the vehicle 608. A GPS may determine a geographic location of the vehicle 608 that is on the road 634.

A system may then determine whether traffic congestion has caused the vehicle 608 to be stopped. A system may determine traffic congestion corresponding to a location of the vehicle 608. An area 642 represents one possible area corresponding to a location of the vehicle 608. For purposes of this illustration, a system may determine that traffic congestion has not caused the vehicle 608 to be stopped because the area 642 does not contain any motor vehicles.

A system may then determine whether the vehicle 608 is within a threshold distance 646 of a traffic control device 644. For purposes of this illustration, the traffic control device 644 is not within the threshold distance 646 of the vehicle 608.

A system may then determine whether the road 634 on which the vehicle 608 is stopped is a highway. For purposes of this illustration, the road 640 is not a highway.

Assume for purposes of this illustration that a system is configured to send a first type of alert when the vehicle 608 is stopped on a road that is not a highway and traffic congestion has not caused the vehicle to be stopped and the vehicle is not within a threshold distance of a traffic control device. Also assume for purposes of this illustration that a system is configured to send a second type of alert indicating a higher urgency than a first type of alert when the vehicle 608 is stopped on a road that is a highway and traffic congestion is not causing the vehicle to be stopped and the vehicle is not within a threshold distance of a traffic control device.

With these assumptions, a system may determine to send a first type of alert the situation 640 because the vehicle 608 is stopped on the road 634 that is not a highway, traffic congestion is not causing the vehicle 608 to be stopped, and the vehicle 608 is not within the threshold distance 646 of the traffic control device 644.

Figure 7:
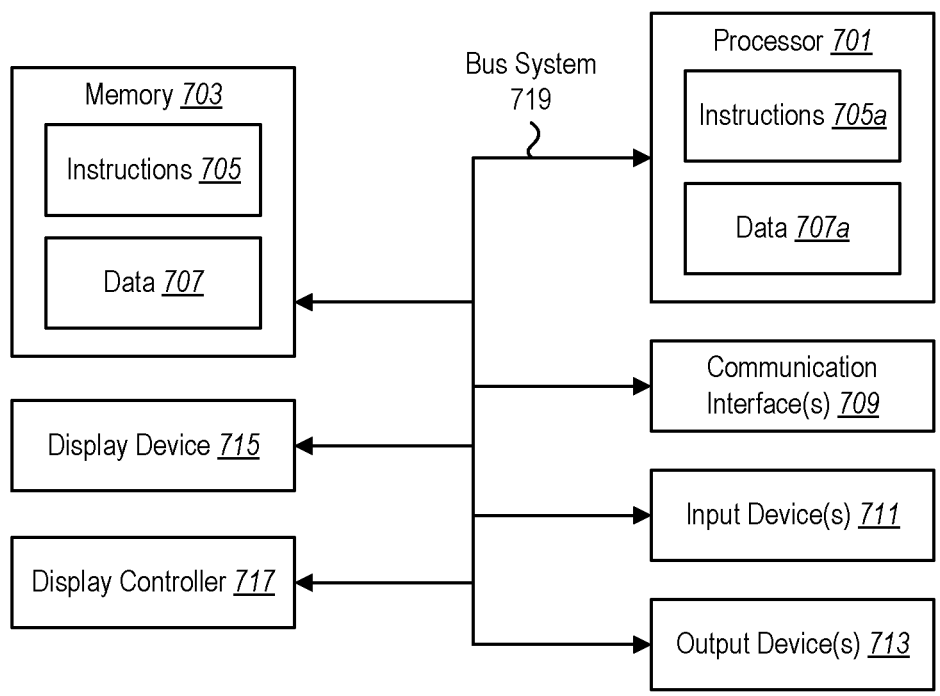
FIG. 7 illustrates certain components that may be included within a computer system.

FIG. 7 illustrates certain components that may be included within a computer system 700. One or more computer systems 700 may be used to implement methods and systems disclosed herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Instructions 705 and data 707 may be stored in the memory 703. The instructions 705 may be executable by the processor 701 to implement some or all of the methods disclosed herein. Executing the instructions 705 may involve the use of the data 707 that is stored in the memory 703. When the processor 701 executes the instructions 705, various portions of the instructions 705a may be loaded onto the processor 701, and various pieces of data 707a may be loaded onto the processor 701.

Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interfaces 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker, printer, etc. One specific type of output device that is typically included in a computer system is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

In accordance with the present disclosure, a method for monitoring a vehicle may include determining that the vehicle is stopped, determining a location where the vehicle is stopped, and determining traffic congestion corresponding to the location where the vehicle is stopped. A safety action may then be taken based at least in part on one or more of whether the vehicle is stopped on a road and whether the traffic congestion is causing the vehicle to be stopped.

In some implementations, the act of taking a safety action may be based at least in part on whether the vehicle is stopped on a highway. The safety action may include sending an alert.

In some implementations, a first type of alert may be sent if the location of the vehicle is within a threshold distance of a highway on-ramp or a highway off-ramp. Otherwise a second type of alert may be sent. The second type of alert may indicate higher urgency than the first type of alert.

In some implementations, a global positioning system may be used to determine the location where the vehicle is stopped. The vehicle may be determined to be stopped on the highway if data from the global positioning system indicates that the location where the vehicle is stopped is on or within a threshold distance of the highway.

In some implementations, the vehicle may belong to a fleet. Sending the alert may include sending the alert to a manager of the fleet.

In some implementations, determining the traffic congestion may include determining one or more of traffic speed, traffic density, traffic volume, traffic flow, or level of service.

In some implementations, the vehicle may be determined to be stopped if the vehicle has not moved for a threshold period of time.

In some implementations, the method may also include determining whether a traffic control device is present at the location of the vehicle. The act of taking the safety action may be based at least in part on absence of the traffic control device.

In some implementations, the vehicle may have at least one associated driver. The safety action may include entering a note in a file associated with the at least one associated driver.

In some implementations, information captured by a camera may be used to determine one or more of that the vehicle is stopped, the location where the vehicle is stopped, or traffic congestion corresponding to the location where the vehicle is stopped.

In some implementations, information from one or more of a radar system or a LIDAR system may be used to determine that the vehicle is stopped.

In accordance with another aspect of the present disclosure, a system for monitoring a vehicle may include one or more processors and memory comprising instructions that are executable by the one or more processors to perform certain operations. The operations may include determining that the vehicle is stopped, determining a location where the vehicle is stopped, and determining traffic congestion corresponding to the location where the vehicle is stopped. A safety action may be taken based at least in part on one or more of whether the vehicle is stopped on a road and whether the traffic congestion is causing the vehicle to be stopped.

In some implementations, the act of taking a safety action may be based at least in part on whether the vehicle is stopped on a highway. The safety action may include sending an alert.

In some implementations, a first type of alert may be sent if the location of the vehicle is within a threshold distance of a highway on-ramp or a highway off-ramp. Otherwise a second type of alert may be sent. The second type of alert may indicate higher urgency than the first type of alert.

In some implementations, a global positioning system may be used to determine the location where the vehicle is stopped. The vehicle may be determined to be stopped on the highway if data from the global positioning system indicates that the location where the vehicle is stopped is on or within a threshold distance of the highway.

In some implementations, determining the traffic congestion may include determining one or more of traffic speed, traffic density, traffic volume, traffic flow, or level of service.

In some implementations, the vehicle may belong to a fleet. Sending the alert may include sending the alert to a manager of the fleet.

In some implementations, the system may additionally include a camera. Information captured by the camera may be used to determine one or more of that the vehicle is stopped, the location where the vehicle is stopped, or traffic congestion corresponding to the location where the vehicle is stopped.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for monitoring a vehicle, the method comprising:
   determining that the vehicle is stopped;
   determining a type of location where the vehicle is stopped;
   determining traffic congestion corresponding to the location where the vehicle is stopped;
   determining that the vehicle has made a stop warranting one or more safety actions responsive to the determining that neither traffic congestion nor traffic control devices have caused the vehicle to stop; and
   taking a safety action corresponding to the vehicle based on determining that the vehicle has made the stop warranting the one or more safety actions.

2. The method of claim 1, further comprising determining whether the vehicle is within a threshold distance of a highway on-ramp or a highway off-ramp.

3. The method of claim 1, wherein taking a safety action includes sending an alert to the vehicle responsive to determining that the vehicle has made the stop warranting the safety action.

4. The method of claim 1, wherein taking the safety action includes providing a first type of alert responsive to determining that the vehicle being stopped within a threshold distance from a highway on-ramp or highway off-ramp.

5. The method of claim 4, wherein taking the safety action includes causing hazard lights of the vehicle to turn on.

6. The method of claim 4, wherein taking the safety action includes one or more of sending an alert to a representative of a carrier of the vehicle, sending an alert to an insurance agent, adding a note to a file of a driver of the vehicle, or sending an alert to motor vehicles near the vehicle.

7. The method of claim 1, wherein determining that the vehicle has made the stop warranting the safety action further includes determining that the vehicle is stopped due to issues with the vehicle or weather conditions.

8. The method of claim 1, wherein determining traffic congestion includes determining the traffic congestion based on one or more of traffic speed, traffic density, traffic volume, traffic flow, or level of service corresponding to the location.

9. The method of claim 1, wherein determining whether traffic congestion has caused the vehicle to stop includes determining that the traffic congestion has caused the vehicle to stop responsive to one or more of traffic speed being less than a threshold speed, traffic density is greater than a threshold density, traffic volume is greater than a threshold volume, traffic flow is less than a threshold flow, or level of service is less than a threshold level.

10. The method of claim 1, wherein determining traffic congestion includes determining the traffic congestion with at least one of one or more cameras coupled to the vehicle or one or more cameras associated with a highway.

11. The method of claim 1, further comprising providing information about the vehicle to a location remote from the vehicle, the information including one or more of an ignition status of the vehicle, a parking brake status of the vehicle, a gear status of the vehicle, mechanical or engine problems of the vehicle, flasher data of the vehicle, tire pressure of the vehicle, and maintenance records of the vehicle.

12. The method of claim 1, wherein determining that the vehicle is stopped includes determining that the vehicle is stopped based on one or more of the location of the vehicle, a speed of the vehicle, the speed of the vehicle over time, whether the vehicle is in park, whether an emergency brake of the vehicle is engaged, or whether an ignition of the vehicle is on or off.

13. The method of claim 1, further comprising determining that the vehicle is stopped due to one or more of engine problems, a flat tire, a border inspection, a weigh station, or road construction.

14. A method for monitoring a vehicle, the method comprising:
   determining that the vehicle is stopped;
   determining a type of location where the vehicle is stopped;
   determining traffic congestion corresponding to the location where the vehicle is stopped;
   determining that the vehicle has made a stop warranting one or more safety actions responsive to the determining that neither traffic congestion nor traffic control devices have caused the vehicle to stop; and
   taking a safety action corresponding to the vehicle based on determining that the vehicle has made the stop warranting the one or more safety actions, wherein the safety action includes:
     providing a first type of alert when the vehicle is stopped within a threshold distance from a highway on-ramp or highway off-ramp; and
     providing a second type of alert having a higher urgency than the first type of alert when the vehicle being stopped a distance greater than the threshold distance from the highway on-ramp or highway off-ramp.

15. A system for monitoring a vehicle, the system comprising:
   one or more processors; and
   memory comprising instructions that are executable by the one or more processors to perform operations comprising:
     determining that the vehicle is stopped;
     determining a type of location where the vehicle is stopped;
     determining traffic congestion corresponding to the location where the vehicle is stopped;
     determining that the vehicle has made a stop warranting one or more safety actions responsive to determining that neither traffic congestions nor traffic control devices have caused the vehicle to stop; and
     taking a safety action corresponding to the vehicle based on determining that the vehicle has made the stop warranting the one or more safety actions.

16. The system of claim 15, wherein the instructions further are executable by the one or more processors to determine whether the vehicle is stopped due to one or more of engine problems, a flat tire, a border inspection, a weigh station, or road construction.

17. The system of claim 15, wherein the instructions are executable by the one or more processors to determine whether the vehicle is within a threshold distance of a highway on-ramp or a highway off-ramp.

18. The system of claim 15, wherein the instructions are executable by the one or more processors to cause hazard lights of the vehicle to turn on responsive to determining that the vehicle has made the stop warranting the safety action.

19. The system of claim 15, wherein the instructions are executable by the one or more processors to cause an alert to be sent to the vehicle, a representative of a carrier of the vehicle, an alert to an insurance agent, or to motor vehicles near the vehicle responsive to determining that the vehicle has made the stop warranting the safety action.

20. The system of claim 15, wherein the instructions are executable by the one or more processors to provide information about the vehicle to a location remote from the vehicle, the information including one or more of an ignition status of the vehicle, a parking brake status of the vehicle, a gear status of the vehicle, mechanical or engine problems of the vehicle, flasher data of the vehicle, tire pressure of the vehicle, and maintenance records of the vehicle.

* * * * *